J. S. & B. L. BAIN.
SEED CORN DRYING DEVICE OR UTENSIL.
APPLICATION FILED MAY 4, 1911.
1,026,550.
Patented May 14, 1912.
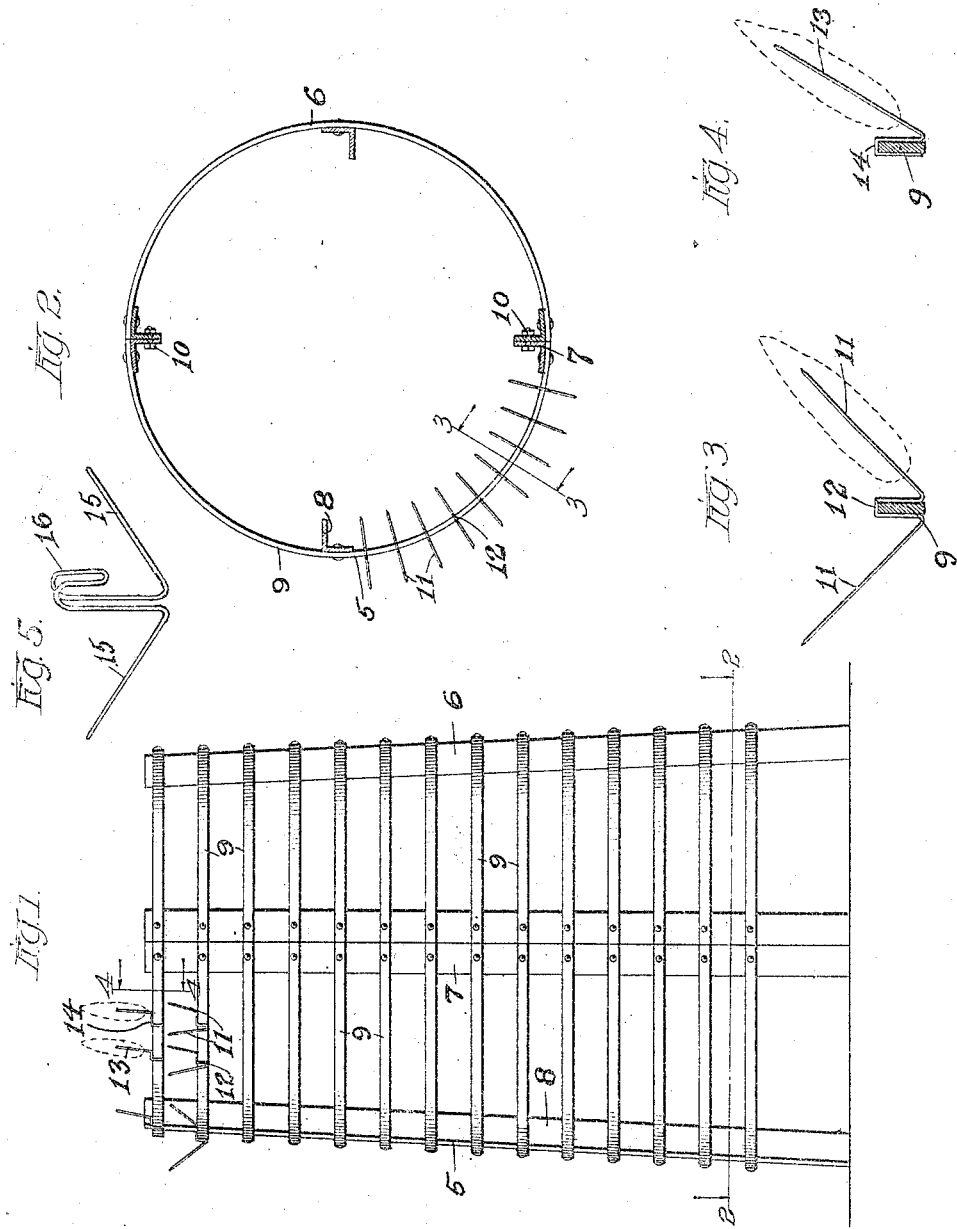

UNITED STATES PATENT OFFICE.

JOSEPH SMITH BAIN, OF LUVERNE, IOWA, AND BENJAMIN L. BAIN, OF CHICAGO, ILLINOIS.

SEED-CORN-DRYING DEVICE OR UTENSIL.

1,026,550.

Specification of Letters Patent. Patented May 14, 1912.

Application filed May 4, 1911. Serial No. 625,029.

*To all whom it may concern:*

Be it known that we, JOSEPH SMITH BAIN and BENJAMIN LANGFORD BAIN, citizens of Canada, residing, respectively, at Luverne, in the county of Kossuth and State of Iowa, and No. 1429 Millard avenue, Chicago, in the county of Cook and State of Illinois, have invented a new and useful Seed-Corn-Drying Device or Utensil, of which the following is a specification.

The invention relates to a drying device, and more particularly to the class of drying racks for seed corn.

The primary object of the invention is the provision of a device of this character in which seed corn ears may be held for the drying of the same by exposure to the sun rays or by artificial heat.

Another object of the invention is the provision of a device of this character in which the ears of corn to be dried may be held, so that they will not contact with each other, so as to avoid the possibility of such ears heating or souring, during the drying process, thus affording a perfect drying thereof.

A further object of the invention is the provision of a drying device which is simple in construction, light but possessing the requisite strength, and durability, portable in character, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of the drying device constructed in accordance with the invention. Fig. 2 is a transverse cross sectional view on the line 2—2 of Fig. 1. Fig. 3 is a sectional view on the line 3—3 of Fig. 2. Fig. 4 is a sectional view on the line 4—4 of Fig. 1. Fig. 5 is a perspective view of a modified form of one of the removable ear supporting holders or brackets.

Similar reference characters indicate corresponding parts throughout the several views of the drawings.

Referring to the drawings by numerals, the device comprises a skeleton frame, including complementary separable sections 5 and 6, each formed of upwardly converging substantially L-shaped intermediate and outer bars 7 and 8, respectively, spaced an equi-distance from each other, and to which are secured outwardly bowed semi-circular shaped iron bands 9 which are arranged transversely of said bars 7 and 8, in spaced relation to each other, the ends of the bands being riveted or otherwise fastened to the outer bars 8, and likewise the medial portions of said bands are fixed to the intermediate bar 7.

The inturned flanges of the L-shaped outer bars 8 of the sections 5 and 6 are designed to abut against each other and have passed therethrough at the desired points thereof the usual bolt members 10, thus detachably securing the said sections together, it being seen that when the sections 5 and 6 are detached from each other, the device may be readily and conveniently stored in the least possible space when not in use, and also the shipment of the same is facilitated, as well as the ready handling thereof. When the sections 5 and 6 are attached together, the bands 9 aline with each other.

Detachably mounted upon the bands 9 are two different forms of brackets or holders, each holder of one of the forms comprising upwardly diverging pointed prongs or arms 11, and an intermediate inverted U-shaped portion 12 connecting the same, the said portion 12 being slightly resilient, so as to clip over any one of the bands 9, while the prongs or arms 11 are adapted to be inserted in the corn ears to be dried. The said holders may be readily adjusted in spaced relation to each other. Each of the other form of holders comprises a pointed prong 13 provided with an inverted U-shaped inner terminal 14 which possesses the requisite resiliency for the clipping of the same upon any one of the bands 9 of the sections, the ears of corn to be dried being engaged on the prong 13 of said holder.

In Fig. 5, there is shown a slight modification of the holder from those previously described, in which there is provided the outturned upwardly diverging prongs 15, and an intermediate vertical hook 16 which engages the bands 9 for the hanging of the said holder thereon, the ears of corn being engaged on the prongs 15 for the drying thereof.

What is claimed is:

1. A drier of the class described, comprising a skeleton frame, including separable sections having horizontally arranged bands, and corn ear holders detachably and adjustably supported upon the bands.

2. A drier of the class described, comprising a skeleton frame, including separable sections having horizontally arranged bands, corn ear holders detachably and adjustably supported upon the bands, and resilient clamping portions formed in the holders for engaging said bands.

JOSEPH SMITH BAIN.
BENJAMIN L. BAIN.

Witnesses:
W. E. KYLER,
JOHN A. ROBERTSON.